July 12, 1966     G. L. OPDYCKE ETAL     3,260,195
ELECTROSTATIC OFFSET METHOD FOR DECORATING
HOT ARTICLE SURFACES
Filed Jan. 4, 1965
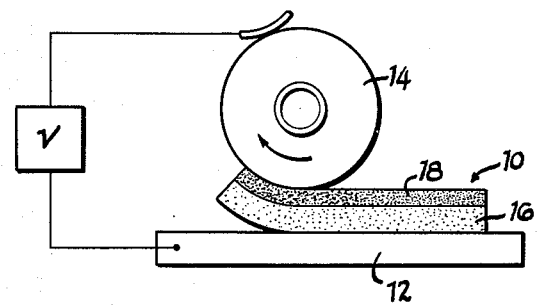
FIG. 1
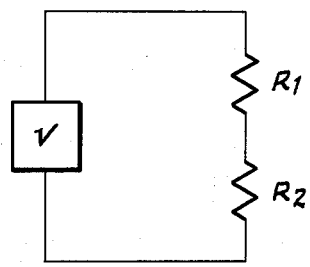
FIG. 2
FIG. 3
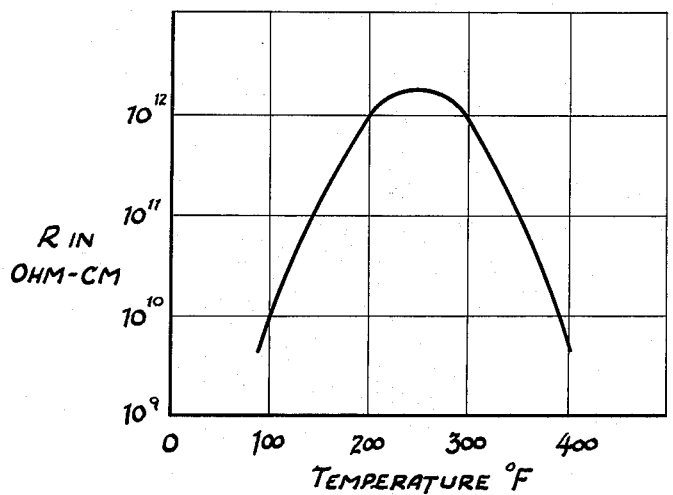
INVENTOR
GEORGE L. OPDYCKE
KENNETH G. LUSHER
BY
ATTORNEYS

United States Patent Office 3,260,195
Patented July 12, 1966

3,260,195
ELECTROSTATIC OFFSET METHOD FOR DECORATING HOT ARTICLE SURFACES
George L. Opdycke, Toledo, and Kenneth G. Lusher, Perrysburg, Ohio, assignors to Owens-Illinois, Inc., a corporation of Ohio
Filed Jan. 4, 1965, Ser. No. 423,286
4 Claims. (Cl. 101—39)

This invention relates to electrostatic offset printing processes and more particularly to improvements in such processes when used for decorating hot article surfaces.

It is a primary object of the present invention to provide an electrostatic offset decorating process having improved image transfer characteristics.

It is another object of the invention to provide an electrostatic offset decorating process in which adverse effects encountered in decorating highly heated articles are counteracted. It is another object of the invention to provide an improved method for preparing a powder image upon an offset plate for subsequent transfer to a highly heated article.

The foregoing, and other objects and features will become apparent by reference to the following specification and to the drawings.

In the drawings:

FIGURE 1 is a schematic diagram of one embodiment of the present invention;

FIGURE 2 is a schematic electrical diagram illustrating an equivalent electrical circuit of the FIGURE 1 arrangement; and FIGURE 3 is a graph showing the variation in electrical resistivity characteristics of a typical powdered frit with temperature.

In FIGURE 1 there is illustrated schematically an electrostatic offset process in which a bed of particles designated generally 10 is transferred from an electrically conductive offset plate 12 to the surface of a glass bottle 14. In the usual case, offset plate 12 takes the form of a flat metal plate. Bed 10 is applied to the plate by placing a stencil screen having an image-shaped aperture therethrough in registry with the upper surface of plate 12 and expressing powder particles through the aperture of the stencil screen, as by brushing, to form an image shaped layer of particles on the plate. For further details of various methods for applying image-shaped layers of particles to offset plates, reference may be had to the copending applications of William H. Wood, Serial No. 242,230 and Kenneth G. Lusher, Serial No. 242,229, both applications having been filed on December 4, 1962, and assigned to the assignee of the present application.

To transfer the image-shaped layer or bed 10 from the offset plate 12 to the article, the article is brought into juxtaposition with the bed and an electric potential source, such as illustrated schematically at V in FIGURE 1, is electrically connected to the article and to the offset plate to establish an electric field which electrically charges the particles within bed 10 and attracts the particles to the surface of the article.

The particular process outlined generally above has been found to be well adapted to the decorating of hot glass articles, such as glass bottles, while the bottles are residually heated from the bottle forming operation to temperatures within the range of 500° to 1200° F. While glass is normally considered to be an electrical non-conductor at ordinary temperatures, its electrical resistivity characteristics at the relatively high temperatures within the range above are substantially lower and within this temperature range, glass is sufficiently conductive to enable it to serve as one electrode of the electric field.

During the transfer of bed 10 from a flat plate such as 12 to the cylindrical surface of the bottle, the bottle is moved into juxtaposed registry with bed 10 and rolled laterally across the bed while the electric field is established by potential source V between the opposed plate and bottle surfaces.

In many instances, the bottle surface is directly in contact with the image-shaped layer or bed 10 supported upon the offset plate during the transfer of the bed from plate 12 to the surface of bottle 14. In the normal case, the particles from which bed 10 is formed are of a powdered glass frit. Many of such frits are commercially available, typical frit formulations being set forth in the above identified Wood application Serial No. 242,230. In FIGURE 3, there is shown a typical curve of resistivity versus temperature for a typical frit employed in this process.

As best seen in FIGURE 3, the resistivity of a typical frit increases with temperature up to temperatures slightly above 200° F. For increasing temperatures, the resistivity curve reaches a peak and then decreases. This particular characteristic of the frit is of especial concern in the decorating of hot articles, particularly when the hot article is in contact with the frit as in the exemplary process schematically illustrated in FIGURE 1.

In FIGURE 2, there is illustrated an equivalent electrical circuit to the arrangement shown in FIGURE 1. In the circuit of FIGURE 2, the resistance R1 represents the electrical resistance between potential source V and the surface of bottle 14 at the region of decorating. The resistance R2 of FIGURE 2 represents the electrical resistance through bed 10 between the surface of bottle 14 and the surface of plate 12. Because plate 12 is conventionally a metallic material, its resistance in the circuit of FIGURE 2 is negligible as compared to that of the bottle and of the frit.

The effectiveness of potential source V in assisting the transfer of the powder bed 10 from plate 12 to the surface of bottle 14 is directly dependent upon the strength of the electric field between the surface of bottle 14 and the surface of plate 12. Because these two surfaces are in electrical contact with each other via the powder bed 10, the potential difference between bottle 14 and plate 12 is directly proportional to the voltage drop across the equivalent electrical resistance R2 through bed 10.

Where bottle 14 is at an elevated temperature within the 500° and 1200° F. range referred to above, the exposure of bed 10 to the heated bottle during the decorating operation is such that the bottle temperature heats the frit particles up to a temperature such that the electrical resistivity of the particles is substantially decreased. The lowering of the resistivity of the frit by the heating effect of the hot bottle thus decreases the potential difference between the bottle surface and the surface of offset plate 12, thereby substantially reducing the effectiveness of the electric field in transferring the frit to the bottle surface.

To overcome this effect, in one embodiment of the present invention, the bed of particles 10 is constituted into layers. The lower of these two layers 16 is formed by brushing the conventional glass frit particles through a stencil screen onto the surface of plate 12.

After the normal image-shaped layer of frit particles has been applied, a second layer 18 of particles is brushed through the same stencil screen to overlie the frit particles. The particles from which layer 18 is formed are chosen for their electrical resistivity characteristics so that, at the temperatures encountered during the transferring operation, layer 18 forms an extremely high resistance layer, thereby maintaining the potential drop through bed 10 at a relatively high potential to assist in the transferring operation. Suitable materials for layer 18 have been found to be beta-eucryptite, tin oxide, Cataphote glass beads, and xerox toner. These substances all not only have high electrical resistivity characteristics over the desired temperature range, but also have relatively high thermal resistivity characteristics and hence, in effect, both electrically and thermlaly insulate frit layer 16 from the hot glass bottle. Articles have been successfully printed with a two layer bed formed in the manner described above at temperatures as high as 1200° F.

In addition to augmenting the effect of the electric field during the transfer operation, the highly resistive layer 18 provides the added advantage in minimizing re-transfer of particles from the bottle, re-transfer occurring in the case where a transferred particle looses its charge and becomes oppositely charged from the bottle surface.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

We claim:

1. In an electrostatic offset process for decorating heated surfaces such as those of hot glass articles residually heated from the article forming operation wherein an image-shaped bed of powdered frit particles is applied to an electrically conductive offset plate, the hot article surface is moved into juxtaposition with the exposed surface of the bed, and an electric potential source is connected to said article and to said plate to establish an electric field between the plate and article surface to assist in the transfer of the bed from the plate to the article surface; the improvement comprising the step of treating the exposed surface of said image-shaped bed prior to the registry of the hot article surface therewith to form a layer at the exposed surface of said bed having relatively high electrical resistivity characteristics as compared to the electrical resistivity characteristics of the frit over the range of temperatures encountered by the exposure of said bed to the hot article during the transfer of the bed thereto.

2. In an electrostatic offset process for decorating heated surfaces such as those of hot glass articles residually heated from the article forming operation wherein an image-shaped bed of powdered frit particles is applied to an electrically conductive offset plate, the hot article surface is moved into juxtaposition with the exposed surface of the bed, and an electric potenital source is connected to said article and to said plate to establish an electric field between the plate and article surface to assist in the transfer of the bed from the plate to the article surface; the improvement comprising the steps of applying said bed to said offset plate by applying a first layer of powdered frit particles selected for their decorating characteristics, and overlying said first layer with a second layer of particles having relatively high electrical and thermal resistivity characteristics as compared to those of the first layer over the range of temperatures encountered by the exposure of said bed to the hot article during the transfer of the bed thereto.

3. The method of preparing an image-shaped layer of powdered frit particles upon an offset plate for subsequent electrical transfer from said plate to the surface of an article heated to a temperature of the order of 500° F. or more comprising the steps of placing a stencil screen having an image defining aperture therethrough in registry with an offset plate, expressing powdered frit particles through the image aperture of said stencil to form an image-shaped layer of powdered frit particles on said plate, and subsequently treating the exposed surface of said layer of powdered frit particles to increase electrical resistivity of said layer of powdered frit particles upon exposure to said heated article.

4. The method of preparing an image-shaped layer of powdered frit particles upon an offset plate for subsequent electrical transfer from said plate to the surface of an article heated to a temperature of the order of 500° F. or more comprising the steps of placing a stencil screen having an image defining aperture therethrough in registry with an offset plate, expressing powdered frit particles through the image aperture of said stencil to form an image-shaped layer of powdered frit particles on said plate, and subsequently applying a coating layer of powder particles through the image aperture of said stencil onto said layer of powdered frit particles, the particles of said coating layer having substantially higher electrical and thermal resistivity characteristics than said powdered frit particles.

References Cited by the Examiner
UNITED STATES PATENTS

| 398,995 | 3/1889 | Atterburg | 117—23 |
| 839,187 | 12/1906 | Norton | 117—23 |
| 2,067,949 | 1/1937 | Rez | 117—23 |
| 2,162,317 | 6/1939 | Rez | 117—23 X |
| 2,746,193 | 5/1956 | Billian. | |
| 3,218,967 | 11/1965 | Childress | 101—114 |

DAVID KLEIN, *Primary Examiner.*

EDGAR S. BURR, *Examiner.*